US011820275B2

(12) United States Patent
Currier et al.

(10) Patent No.: US 11,820,275 B2
(45) Date of Patent: Nov. 21, 2023

(54) CARRIER PLATFORM WITH SUSPENSION MECHANISM FOR SUPPORTING A VIBRATION-SENSITIVE LOAD ON A VEHICLE

(71) Applicant: Cabin Technologies, Inc., San Francisco, CA (US)

(72) Inventors: Thomas J. Currier, San Francisco, CA (US); Christopher A. Tacklind, Menlo Park, CA (US)

(73) Assignee: Daniel R. Brettschneider, Tacoma, WA (US)

( * ) Notice: Subject to any disclaimer, the term of this patent is extended or adjusted under 35 U.S.C. 154(b) by 621 days.

(21) Appl. No.: 17/085,326

(22) Filed: Oct. 30, 2020

(65) Prior Publication Data

US 2022/0134936 A1 May 5, 2022

(51) Int. Cl.
*F16F 15/02* (2006.01)
*B60P 3/38* (2006.01)
*B60P 7/16* (2006.01)

(52) U.S. Cl.
CPC .................. *B60P 3/38* (2013.01); *B60P 7/16* (2013.01); *F16F 15/022* (2013.01); *B60G 2200/18* (2013.01); *B60G 2202/322* (2013.01); *B60G 2300/04* (2013.01); *B60G 2800/012* (2013.01); *B60G 2800/014* (2013.01); *B60G 2800/016* (2013.01)

(58) Field of Classification Search
None
See application file for complete search history.

(56) References Cited

U.S. PATENT DOCUMENTS

| | | | |
|---|---|---|---|
| 1,998,206 A | 4/1935 | Rosenzweig |
| 2,281,955 A | 5/1942 | Rosenzweig |
| 3,701,499 A | 10/1972 | Schubert et al. |
| 3,882,558 A | 5/1975 | Christensen |

(Continued)

FOREIGN PATENT DOCUMENTS

| | | | |
|---|---|---|---|
| CN | 111895039 | * | 11/2020 |
| KR | 101522711 | * | 5/2015 |

OTHER PUBLICATIONS

ABS—American Bureau of Shipping, "Crew Habitability on Offshore Installations", Guide by American Bureau of Shipping, May 1, 2002, 122 pgs., Houston, TX.

(Continued)

*Primary Examiner* — Joseph D. Pape
(74) *Attorney, Agent, or Firm* — Marek Alboszta (57) ABSTRACT

A carrier platform with a suspension mechanism and suspension methods for supporting a vibration-sensitive load including humans and sensitive objects or cargo in a vehicle such as a terrestrial vehicle, a marine vehicle or aircraft. The suspension mechanism deploys a set of linkage elements for accommodating linear motion of the carrier platform in a vertical linear degree of freedom (Z-axis) and in two horizontal linear degrees of freedom (X- and Y-axes). The suspension mechanism uses springs attached to the carrier platform for biasing it along the vertical linear degree of freedom. The suspension mechanism also has an active damping device with a set of motors to dampen vibrations experienced by the carrier platform in at least one translational degree of freedom.

21 Claims, 8 Drawing Sheets

(56) References Cited

U.S. PATENT DOCUMENTS

| | | | |
|---|---|---|---|
| 3,966,009 | A | 6/1976 | Meacockll et al. |
| 4,107,797 | A | 8/1978 | Maxwell |
| 4,265,328 | A | 5/1981 | Rowa et al. |
| 4,713,851 | A | 12/1987 | Rosquist |
| 4,783,038 | A | 11/1988 | Gilbert et al. |
| 4,977,631 | A | 12/1990 | Bretz |
| 5,052,529 | A | 10/1991 | Sutcliffe et al. |
| 5,062,507 | A | 11/1991 | Roche |
| 5,149,066 | A | 9/1992 | Snaith et al. |
| 5,169,110 | A | 12/1992 | Snaith et al. |
| 5,218,728 | A | 6/1993 | Lloyd et al. |
| 5,257,680 | A | 11/1993 | Corcoran et al. |
| 5,375,879 | A | 12/1994 | Williams et al. |
| 5,638,560 | A | 6/1997 | Rigdon et al. |
| 5,734,246 | A | 3/1998 | Falangas |
| 6,202,492 | B1 | 3/2001 | Ohsaki et al. |
| 6,263,527 | B1 | 7/2001 | Ross et al. |
| 6,493,886 | B1 | 12/2002 | Vanpage et al. |
| 6,547,205 | B2 | 4/2003 | Carter et al. |
| 6,588,554 | B2 | 7/2003 | Fujita et al. |
| 6,631,526 | B1 | 10/2003 | Enright |
| 6,695,799 | B2 | 2/2004 | Kitadou et al. |
| 6,997,515 | B2 | 2/2006 | Gupta et al. |
| 7,068,444 | B2 | 6/2006 | Nishi |
| 7,185,867 | B2 | 3/2007 | Hill et al. |
| 7,248,996 | B2 | 7/2007 | Uenishi et al. |
| 7,401,368 | B1 | 7/2008 | Saucedo |
| 7,489,987 | B2 | 2/2009 | Heiland et al. |
| 7,513,516 | B2 | 4/2009 | Ryan |
| 7,740,234 | B2 | 6/2010 | Robbins et al. |
| 7,983,813 | B2 | 7/2011 | Ummethala et al. |
| 8,095,268 | B2 | 1/2012 | Parison et al. |
| 8,162,299 | B2 | 4/2012 | Hiley et al. |
| 8,490,952 | B1 | 7/2013 | Vogel et al. |
| 8,548,678 | B2 | 10/2013 | Ummethala et al. |
| 8,655,554 | B2 | 2/2014 | Lin |
| 8,781,681 | B2 | 7/2014 | Parison et al. |
| 8,829,899 | B2 | 9/2014 | Polzer et al. |
| 8,888,185 | B2 | 11/2014 | Liao |
| 8,998,316 | B2 | 4/2015 | Naughton et al. |
| 9,043,721 | B2 | 5/2015 | Takenaka et al. |
| 9,053,585 | B2 | 6/2015 | Naylor |
| 9,072,387 | B2 | 7/2015 | Lobry et al. |
| 9,300,872 | B2 | 3/2016 | McClatchie |
| 9,353,824 | B2 | 5/2016 | Kraner et al. |
| 9,358,910 | B2 | 6/2016 | Howard |
| 9,416,844 | B2 | 8/2016 | Renard et al. |
| 9,463,805 | B2 | 10/2016 | Kirsch et al. |
| 9,500,489 | B1 | 11/2016 | Ng |
| 9,511,300 | B1 | 12/2016 | Huron |
| 9,526,665 | B2 | 12/2016 | Rawls-Meehan et al. |
| 9,629,471 | B2 | 4/2017 | VanHool et al. |
| 9,655,797 | B2 | 5/2017 | Rawls-Meehan et al. |
| 9,676,386 | B2 | 6/2017 | Remillard et al. |
| 9,702,349 | B2 | 7/2017 | Anderson et al. |
| 9,729,961 | B2 | 8/2017 | Howard et al. |
| 9,765,925 | B2 | 9/2017 | Lewis |
| 9,783,086 | B2 | 10/2017 | Parker et al. |
| 10,004,873 | B1 | 6/2018 | Hur et al. |
| 10,064,784 | B2 | 9/2018 | Rawls-Meehan |
| 10,293,731 | B2 | 5/2019 | Saunders |
| 11,685,303 | B2 * | 6/2023 | Currier ............... B60P 3/38 296/190.02 |
| 2002/0153467 | A1 | 10/2002 | Allen et al. |
| 2008/0230968 | A1 | 9/2008 | Kubo et al. |
| 2009/0064808 | A1 | 3/2009 | Parison et al. |
| 2009/0236874 | A1 | 9/2009 | Ekberg et al. |
| 2010/0252712 | A1 | 11/2010 | Ha |
| 2012/0011657 | A1 | 1/2012 | Kovacs et al. |
| 2015/0045608 | A1 | 2/2015 | Karp et al. |
| 2017/0037926 | A1 | 2/2017 | Kronkright et al. |
| 2017/0136842 | A1 | 3/2017 | Anderson et al. |

OTHER PUBLICATIONS

Azizan, Mohd Amzar, "Characterization of the Influence of Vibrations on the Vehicle Occupant Drowsiness", PhD Thesis, RMIT University, School of Engineering, Apr. 12, 2016, 166 pgs.

Bayer, Laurence et al., "Rocking synchronizes brain waves during a short nap", Current Biology vol. 21, No. 12, 2011, pp. R461-R462.

Coffin, Spencer et al., "Defensive Surface Roadway Vibration Dampening Inertia Wave", Interactive Qualifying Project, Worcester Polytechnic Institute, May 1, 2012, 155 pgs.

Elgharib, Mohamed A. et al., "Video Magnification in Presence of Large Motions", Qatar Computing Research Institute & MIT CSAIL, IEEE, 2015, 9 pgs.

Evers, Willem-Jan, "Improving driver comfort in commercial vehicles: modeling and control of a low-power active cabin suspension system", PhD Thesis, Technische Universitat Eindhoven, Jan. 1, 2010, 238 pgs.

Giacomin, Joseph A., "An Experimental Investigation of the Vibrational Comfort of Child Safety Seats", PhD Thesis, The University of Sheffield, Dept. of Mechanical Engieering, Dec. 1, 2012, 252 pgs.

Granlund, Johan, "Vehicle and Human Vibrationn due to Road Condition", Northern Periphery Programme EU, Jan. 1, 2013, 113 pgs.

Gutierrez, Guillermo, et al., "Respiratory rate variability in sleeping adults without obstructive sleep apnea", Physiological Reports ISSN 2051-817X, vol. 4, Iss. 17, 2016, 9 pgs.

Hanieh, Ahmed Abu, "Active Isolation and Damping of Vibrations via Stewart Platform", PhD Thesis, Universite Libre de Bruxelles, Active Structures Laboratory, Apr. 1, 2003, 155 pgs.

Kimura, Hitoshi et al., "Mechanical Bed for Investigating Sleep-Inducing Vibration", Hindawi Journal of Healthcare Engineering, vol. 2017, Article ID 2364659, Jul. 9, 2017, 9 pgs.

NASA, "Guidelines for Noise and Vibration Levels for the Space Station", Langley Research Center, NASA Contractor Report 178310, Jun. 1, 1987, 39 pgs.

Nato, "Backache and Back Discomfort", AGARD (Advisory Group for Aerospace Research & Development), Conference Proceedings No. 378, Aug. 26, 1986, 269 pgs.

Nirala, Chandrakant Kumar, "A Novel Semi-active Suspension System for Automobiles Using Jerk-Driven Damper", Master's Thesis, Indian Institute of Technology Hyderabad, Jul. 1, 2011, 65 pgs.

Omlin, Ximena et al., "Effect of Rocking Movements on Respiration", PLOS One, 11(3):e0150581, Mar. 8, 2016, 11 pgs.

Raemaekers, A.J.M, "Active vibration isolator design for ambulance patients", Mater's Thesis, University of Technology Eindhoven, Dept. of Mechanical Engineering, Jan. 1, 2009, 136 pgs.

Shirahatt, Anil et al., "Optimal Design fop Passenger Car Suspension for Ride and Road Holding", Journal of the Braz. Soc. of Mech. Sci. & Eng.—Copyright ABCM, vol. XXX, No. 1, Jan.-Mar. 2008, pp. 66-76.

Zavrel, Erik A. et al., "A Novel Two-Degree-of-Freedom Mechatronic Bed for Insomnia Treatment", Dept. of Biomedical Eng. Cornell University, Proceedings of the 2017 Design of Medical Devices Conference, ASME, Apr. 10-13, 2017, Minneapolis, MN, 2 pgs.

* cited by examiner

CARRIER PLATFORM WITH SUSPENSION MECHANISM FOR SUPPORTING A VIBRATION-SENSITIVE LOAD ON A VEHICLE

FIELD OF THE INVENTION

The present invention relates generally to carrier platforms with suspension mechanisms having active and passive vibration damping and vibration attenuation measures so as to enable a vibration-sensitive load to be safely transported on the carrier platform in a travelling vehicle.

BACKGROUND OF THE INVENTION

Vehicles travelling on roads, as well as marine vehicles and aircraft expose their loads including human occupants to various types of mechanical vibrations. The amplitude, energy and frequency of such vibrations affect the vibration-sensitive loads that the vehicles carry. The prior art contains many teachings spanning a period of over 100 years on the mechanics of suspensions and vibration dampers to counteract undesirable or unwanted motion caused by mechanical vibrations. These prior teachings typically focus on the primary suspension of the vehicle and its active, semi-passive and passive elements. In particular, the prior art presents various types of controls, springs, shocks, struts, pneumatics, fluidics and still other approaches to improve primary suspensions in vehicles.

Despite clear progress in the design of primary suspensions, the problem of vibrations that are passed on to vibration-sensitive loads with deleterious effects has not been solved. The problem was just mitigated to some extent and vibrations remain an issue. Thus, the many types of vibrations encountered in vehicular travel and their effects on sensitive loads continue to be studied extensively.

Many past studies paid special attention to conditions under which a human passenger may suffer from the effects of such vibrations on their bodies. Such conditions arise, for example, in ambulances and emergency medical care vehicles carrying injured passengers. Excellent overviews of the effect of vibrations and proposals for diminishing the transfer of road vibrations into an ambulance to a laying or recumbent patient are discussed by Coffin, Spencer et al., "Defensive Surface Roadway Vibration Dampening Inertia Wave", An Interactive Qualifying Project, Worcester Polytechnic Institute, May 2012 as well as by Raemaekers, A. J. M., "Active vibration isolator design for ambulance patients", Master's Thesis, Department of Mechanical Engineering and Dynamics and Control Group, Eindhoven University of Technology, January 2009. More general review of vibrations and their effects on the human body looking past road-bound vehicles to non-terrestrial ones is presented by NASA, "Guidelines for Noise and Vibration Levels for the Space Station", N87-24162 Committee on Hearing, Bioacoustics, and Biomechanics, National Research Council, Washington D.C., June 1987.

Numerous prior art references teach secondary suspensions and other approaches to mitigate the impact of vibrations on drivers and sitting passengers. These solutions concentrate on a seated driver or passenger, and are hence focused on driver's seat construction and support in applying vibration isolation, damping and various active, semi-passive and passive measures. However, vibration mitigation and removal solutions that are applicable to upright and sitting passengers as well as drivers are not suitable for persons that are fully reclined or laying down or for other types of vibration-sensitive loads.

When it comes to passengers that are laying down in a vehicle, as in the case of passengers wishing to sleep or drivers taking a nap while their replacement is driving, different solutions are needed. To address the challenges of such recumbent passengers, the prior art contains various teachings dealing specifically with the mounting of suitable mechanisms to support a sleeping passenger in the fully reclined or laying position. Corresponding beds, sleeper systems, suspensions and mattress supports in trucks, tractors and still other vehicles are discussed in detail by U.S. Pat. No. 7,401,368 to Saucedo; U.S. Pat. No. 6,631,526 to Enright; U.S. Pat. No. 6,263,527 to Ross et al.; U.S. Pat. No. 5,638,560 to Ringdon et al.; U.S. Pat. No. 5,218,728 to Lloyd et al.; U.S. Pat. No. 4,977,631 to Bretz; U.S. Pat. No. 4,107,797 to Maxwell, Sr.; and by U.S. Pat. No. 3,882,558 to Christensen.

Many of the prior art solutions to secondary suspensions for sleeper systems, including several of the above cited ones, use a scissoring mechanism to accommodate up and down movement along the vertical or Z-axis. Scissor-type mechanisms automatically provide for some compliance in the horizontal directions, namely along the X- and Y-axes. However, in accommodating some horizontal forces experienced due to mechanical vibrations scissor-type mechanisms exhibit considerable amounts of backlash or slop. This characteristic is not well-suited for dealing with horizontal vibrations when the secondary suspension is carrying a vibration-sensitive load.

Thus, despite the many approaches to both mitigating vibrations in vehicles, the problem of efficiently and rapidly mitigating vibration and its effects on vibration-sensitive loads, such as passengers and/or cargo have not been solved. More precisely, in practical applications where vibration-sensitive loads rest on secondary suspensions are deployed in a vehicle subject to vibration, there is no satisfactory approach to dealing with the vibrations produced by the travel in both the vertical direction and along horizontal directions.

OBJECTS AND ADVANTAGES

In view of the shortcomings of the prior art, it is an object of the present invention to provide a carrier platform with a suspension mechanism that can act as a secondary suspension to protect a vibration-sensitive load supported by the carrier platform from vibrations in a number of degrees of freedom. Specifically, it is an object of the invention to provide a suspension mechanism with means to attenuate vibrations in the vertical degree of freedom and also in the horizontal degrees of freedom while minimizing backlash.

Yet another object of the invention is to provide for the suspension mechanism to actively dampen and/or passively attenuate many combinations of the six degrees of freedom of translational and rotational motion that the carrier platform may experience, including and up to all six degrees of freedom.

Still other objects and advantages of the invention will become apparent upon reading the detailed specification and reviewing the accompanying drawing figures.

SUMMARY OF THE INVENTION

The objects and advantages of the invention are provided by a carrier platform and methods for suspending such carrier platform using a suspension mechanism to support a vibration-sensitive load on a vehicle. The vehicle can be of any type, such as, e.g., a terrestrial vehicle, a marine vehicle or an aircraft. The vibration-sensitive load can be represented by one or more persons. In such cases, the carrier platform can have accommodations for the one or more persons, including but not limited to sleeping accommodations, living accommodations and/or still other accommodations for traveling. Alternatively, or in addition, the vibration-sensitive load can include a cargo or materials to be transported. Suitable accommodations for such cargo can be provided on the carrier platform.

The suspension mechanism has a set of linkage elements attached to the carrier platform for accommodating linear motion of the carrier platform in a vertical linear degree of freedom and in two horizontal linear degrees of freedom. The vertical linear degree of freedom is chosen to lie along the Z-axis, which extends in the vertical direction. The two horizontal linear degrees of freedom are assigned to the X- and Y-axes, respectively.

The suspension mechanism also has a set of springs attached to the carrier platform for biasing it along the vertical linear degree of freedom. In other words, the set of springs set or bias the carrier platform to a certain position along the Z-axis. In some embodiments, the set of springs can be embodied by pneumatic springs or air bags controlled by suitable inflation and deflation provisions including an air reservoir or tank.

The suspension mechanism further includes an active damping device with a set of motors. The active damping device is also attached to the carrier platform and its purpose is to dampen vibrations experienced by the carrier platform in at least one translational degree of freedom. In other words, the active damping device dampens vibrations along at least one of the X-, Y- and Z-axes.

It is important to incorporate or mount vibration isolators within the set of linkage elements. The vibration isolators are mechanically tuned to attenuate vibrations of the carrier platform in at least the two horizontal linear degrees of freedom. In other words, the vibration isolators attenuate vibrations along the X- and Y-axes. Preferably, the vibration isolators include at least one passive isolator. Further, the one or more passive isolators are tuned to specifically attenuate vibrations of the carrier platform that exhibit high-frequency and small amplitude.

In some embodiments the active damping device is further equipped with a passive vibration isolation bar for attenuating vibrations that the carrier platform experiences in a rotational degree of freedom. The rotational degrees of freedom are usually described by roll, pitch and yaw and their values are expressed by rotation angles, such as, e.g., ($\varphi$, $\theta$, $\psi$). The rotation angles quantify the amount of roll, pitch and yaw about the X-, Y- and Z-axes. Furthermore, the passive vibration isolation bar can have one or more passive isolators incorporated in it.

In certain embodiments, the vibration isolators and the active damping device are configured to actively dampen and passively attenuate the vertical degree of freedom (along the Z-axis), the two horizontal degrees of freedom, and up to three rotational degrees of freedom of the carrier platform. In other words, all six degrees of freedom can be addressed by active damping and passive attenuation in such embodiments. The rotational degrees of freedom, namely roll, pitch and yaw can be attenuated passively. Alternatively, roll, pitch and yaw can be actively dampened.

The active damping device preferably has a set of four motors. In some embodiments the four motors have a common drive. In other embodiments, the four motors can each be provided with an individual drive.

Depending on the intended use of the carrier platform, an attachment mechanism can be provided for mounting the carrier platform in the vehicle. The attachment mechanism may be of particular importance when the vibration-sensitive load includes one or more persons. In a preferred embodiment the attachment mechanism has a swivel for accommodating the carrier platform in a deployed configuration and in a stowed configuration. The deployed configuration can be designed to permit a person or a passenger to sit or lie down, while the stowed configuration can be designed to create maximum space for the person or persons to move about in the vehicle.

The method of invention for suspending a carrier platform to support a vibration-sensitive carrier load on a vehicle involves attaching the set of linkage elements to the carrier platform so as to accommodate linear motion of the carrier platform along the Z-axis, or the vertical linear degree of freedom, and along the X- and Y-axes, or the two horizontal linear degrees of freedom. The method further calls for attaching a set of springs, which may be embodied by pneumatic springs, to the carrier platform for biasing it along the Z-axis, or along the vertical linear degree of freedom. The method also calls for attaching an active damping device having a set of motors to the carrier platform for damping vibrations experienced by the carrier platform in at least one translational degree of freedom, i.e., along X-, Y- or Z-axis. Finally, the method calls for mounting vibration isolators within the set of linkage elements and tuning them mechanically to attenuate vibrations experienced by the carrier platform in at least the two horizontal linear degrees of freedom parameterized by the X- and Y-axes.

In some embodiments of the method at least one passive isolator is mounted among the vibration isolators. The passive isolator is tuned to attenuate small amplitude vibrations of the carrier platform in a high-frequency range. Additionally, the method can include attenuating vibrations in at least one rotational degree of freedom with the aid of a passive vibration isolation bar in the active damping device. In fact, active damping and passive attenuation of the vertical degree of freedom, the two horizontal degrees of freedom and up to all three rotational degrees of freedom can be implemented. The rotational degrees of freedom can be passively attenuated or actively dampened.

The present invention, including the preferred embodiment, will now be described in detail in the below detailed description with reference to the attached drawing figures.

DETAILED DESCRIPTION

The drawing figures and the following description relate to preferred embodiments of the present invention by way of illustration only. It should be noted that from the following discussion, alternative embodiments of the methods and systems disclosed herein will be readily recognized as viable options that may be employed without departing from the principles of the claimed invention. Likewise, the figures depict embodiments of the present invention for purposes of illustration only. One skilled in the art will readily recognize from the following description that alternative embodiments of the methods and systems illustrated herein may be employed without departing from the principles of the invention described herein.

Figure 1:
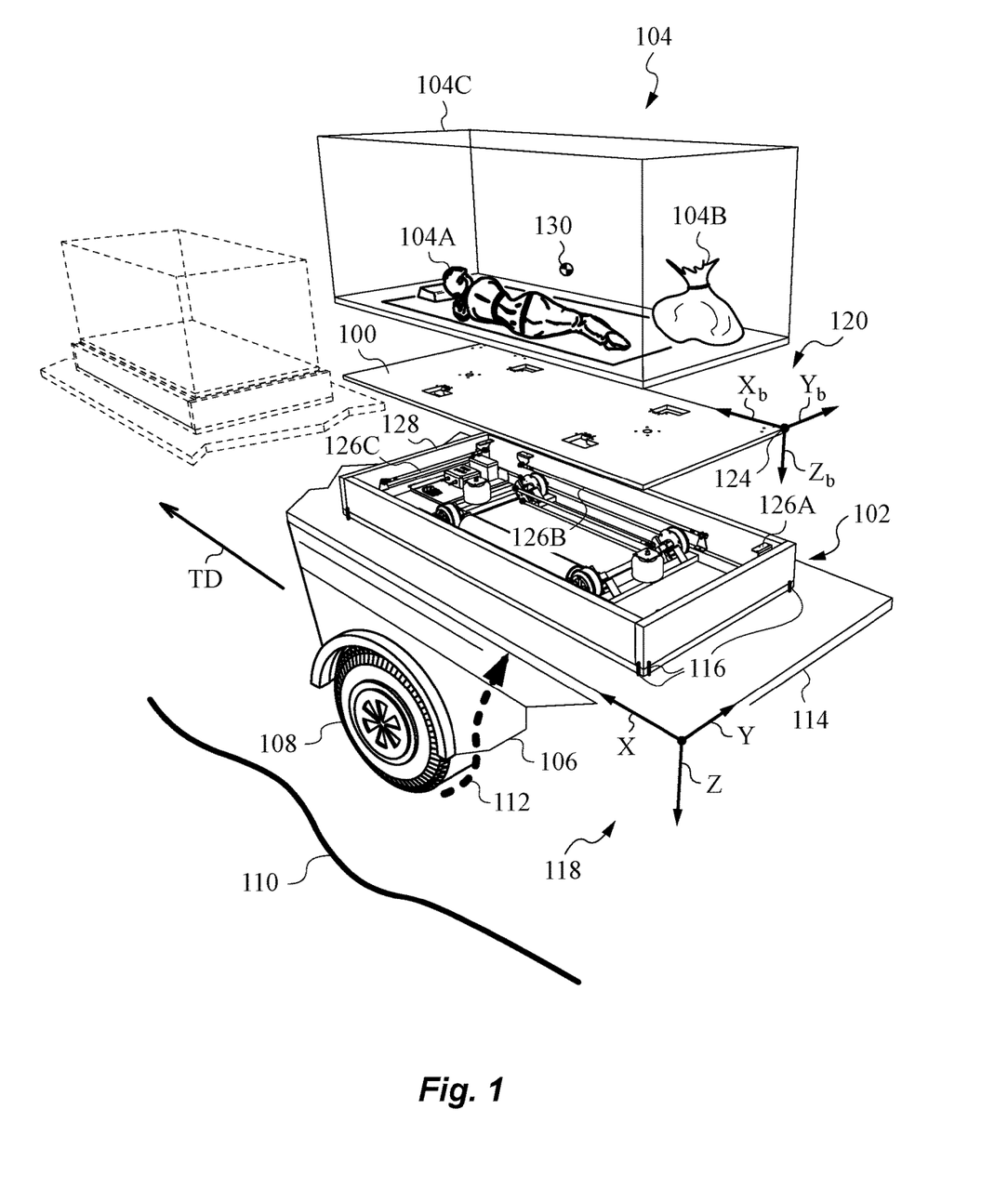
FIG. 1 is an isometric diagram showing an exploded view of a carrier platform with suspension mechanism for supporting a vibration-sensitive load mounted on a vehicle

The isometric diagram found in FIG. 1 shows several of the main features of a carrier platform 100 according to the invention in an exploded view. Carrier platform 100 has a suspension mechanism 102 for supporting a vibration-sensitive load 104 on a vehicle 106. Only a small portion of vehicle 106 that includes just one of its wheels 108 is illustrated in FIG. 1 for reasons of clarity. Also, to the left of the exploded view, FIG. 1 shows drawn with dashed lines an assembled view of carrier platform 100 and suspension mechanism 102 carrying load 104 and mounted on vehicle 106 for reference.

In the present embodiment, vehicle 106 is a terrestrial vehicle that travels on a surface 110 such as a highway, a road or a street. Vehicle 106 can be a bus, a lorry, a truck or a car that travels on wheels 108 along a travel direction indicated by an arrow TD. During travel, wheels 108 roll on the surface of road 110 that is usually not even, smooth, straight or flat. Indeed, road 110 will typically have turns and straight sections with bumps, depressions, holes, obstacles, cracks and other imperfections and road hazards.

Travelling in vehicle 106 along road 110 with curves and imperfections induces various types of movements, jumps, swings and perturbations all of which will collectively and generally be referred to herein as vibrations. Vibrations 112 are transmitted via a primary vehicle suspension (not shown) to the frame of vehicle 106 and thereby to carrier platform 100 that is mounted on vehicle 106. At present, we will not be concerned with aspects of the primary suspension of vehicle 106 such as its construction (e.g., coil springs) or performance. Thus, vibrations 112 are only indicated schematically by a thick and dashed arrow to show that vibrations 112 are transmitted to suspension mechanism 102 that supports carrier platform 100.

For completeness, it should be noted that terrestrial vehicle 106 travels on the surface of planet Earth. In cases where vehicle 106 is not a car, bus or truck but a train or carriage travelling on rails or a vehicle that does not travel on Earth's surface, the dynamics determining how vibrations 112 are produced and transmitted to carrier platform 100 will differ. In other words, the vehicle can be of any type, such as, e.g., a terrestrial vehicle, a marine vehicle or an aircraft. Nevertheless, a person skilled in the art will recognize how to adapt the present exemplary embodiments to such cases.

In the present embodiment, carrier platform 100 and its suspension mechanism 102 are mounted on a flat portion of the frame of vehicle 106, specifically on a vehicle frame portion 114. Frame portion 114 may even be dedicated to carrier platform 100 and its suspension mechanism 102 in some embodiments. Further, an attachment mechanism 116 in the form of bolts is provided on suspension mechanism 102 for mounting it along with carrier platform 100 that it supports on frame portion 114 of vehicle 106. Bolts 116 attach to frame portion 114 in any suitable and mechanically stable manner, e.g., by fitting into corresponding mounting holes (not shown).

The diagram in FIG. 1 also shows a Cartesian coordinate system 118 that will be used herein to help describe and parameterize the six degrees of freedom of rigid body motion in the frame of reference established by vehicle 106. Because the frame of reference established by coordinate system 118 is so central in the present teachings no subscripts are used to designate its axes X, Y, Z. Conveniently, the direction of travel TD of vehicle 106 is taken to be co-extensive with the positive X-axis of coordinate system 118. The Y-axis extends laterally and defines linear side-to-side movement. The Z-axis is aligned with the vertical and its positive direction is taken to point down. Defined in this manner, coordinate system 118 is right-handed. Of course, other coordinate systems and conventions may be used.

To describe the three degrees of translational freedom and the three degrees of rotational freedom that carrier platform 100 experiences in the reference frame of vehicle 106 while supported by suspension mechanism 102 that is mounted to frame portion 114 with attachment mechanism 116 we introduce body coordinates 120 that parameterize carrier platform 100. Note that body coordinates refer to carrier platform 100 only, rather than to its suspension mechanism 102 that is attached to vehicle 106 and is thus properly described in the previously introduced vehicle coordinates 118. The Cartesian axes of body coordinates 120 have a subscript "b", hence $K_b$, $Y_b$ and $Z_b$ to distinguish them from axes X, Y, Z of vehicle coordinates 118 and/or any other coordinate systems that may be required, e.g., Earth's coordinates that parameterize its surface and road 110.

Suspension mechanism 102 of carrier platform 100 can be considered a secondary suspension for supporting vibration-sensitive load 104. Suspension mechanism 102 is designed to keep carrier platform 100 in a default or equilibrium position and orientation. When in this equilibrium position and orientation, sometimes jointly referred to as pose, body coordinates 120 parameterizing the position and orientation of carrier platform 100 can be centered at an origin 124 that is offset from the origin of vehicle coordinates 118. Depending on the mounting of carrier platform 100, origin 124 may be placed at a 'center of rotation' as explained further below. At the same time, axes $K_b$, $Y_b$ and $Z_b$ of body coordinates 120 are parallel to axes X, Y, Z of vehicle coordinates 118. The equilibrium position and orientation, or equilibrium pose is typically assumed by carrier platform 100 when no external forces act on it.

Secondary suspension represented by suspension mechanism 102 has a set of linkage elements 126A, 126B, 126C that attach carrier platform 100 to a mounting frame 128 of suspension mechanism 102. The set of linkage elements 126A, 126B, 126C are attached to carrier platform 100 for accommodating linear motion of carrier platform 100 in a vertical linear degree of freedom and in two horizontal linear degrees of freedom. The vertical linear degree of freedom is chosen to lie along the Z-axis, which extends in the vertical direction. The two horizontal linear degrees of freedom are assigned to the X- and Y-axes, respectively.

In the equilibrium state, i.e., when no motion, perturbation or vibration 112 from travel on road 110 generates any forces that can be transferred to carrier platform 100 via suspension mechanism 102, carrier platform 100 maintains the equilibrium pose (position and orientation). Differently put, at times when no forces act on carrier platform 100, all six degrees of rigid body motion of carrier platform 100 are maintained at their zero or default values with the aid of suspension mechanism 102.

Persons skilled in the art may consider the mass of vehicle 106 along with suspension mechanism 102 but without carrier platform 100 and vibration-sensitive load 104 as the un-sprung mass. Meanwhile, the mass of carrier platform 100 and vibration-sensitive load 104 may be considered as the sprung mass. This is in close analogy to the primary suspension of vehicle 106. There the un-sprung mass consists of all parts that are not supported by the primary suspension, while the sprung mass includes all parts of vehicle 106 that are supported by the primary suspension, such as, e.g., the cabin.

To better explain the motion that is experienced by carrier platform 100 during travel of vehicle 106 on road 110, it is important to see how this motion is partitioned among the six degrees of freedom that it affects. Motion in some of these degrees of freedom is much more problematic that in others. Thus, it is important to formally introduce the six degrees of freedom of rigid body motion available to carrier platform 100. After reviewing them, we will return to the details and operation of suspension mechanism 102 and its parts.

Figure 2A:
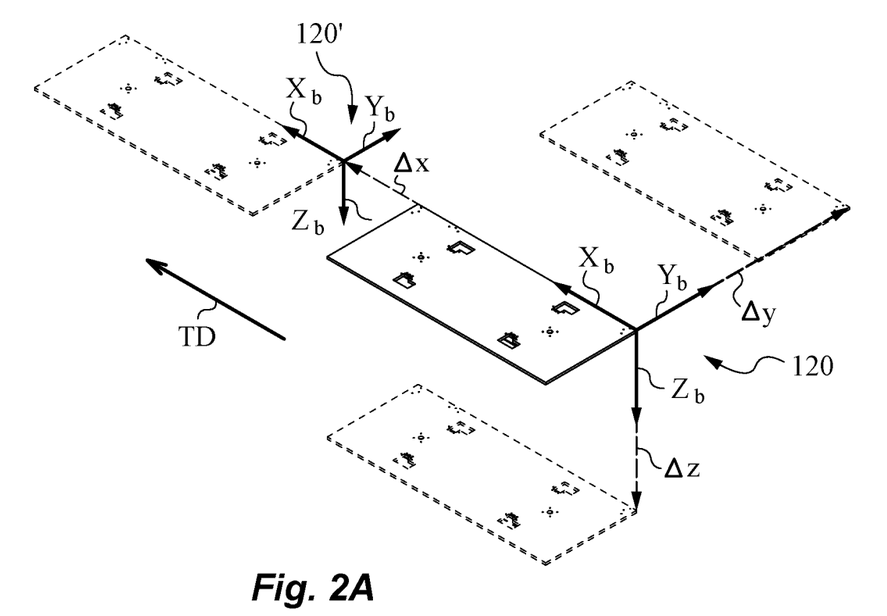
FIG. 2A-B are isometric views showing the three possible translational degrees of freedom and the three possible rotational degrees of freedom available to the carrier platform of FIG. 1

To explain the first three linear or translational degrees of freedom, FIG. 2A shows just carrier platform 100 without suspension mechanism 102. The axes $K_b$, $Y_b$, $Z_b$ of body coordinates 120 are oriented parallel with axes X, Y, Z of coordinate system 118 of vehicle 106 (see FIG. 1). However, the origins of vehicle coordinates 118 and body coordinates 120 of carrier platform 100 are offset, as previously mentioned.

In the equilibrium pose all coordinate displacements or linear translations indicated by $\Delta x$, $\Delta y$ and $\Delta z$ with dashed vectors are zero. Although all translations $\Delta x$, $\Delta y$, $\Delta z$ as shown are positive, negative translations are obviously included. Now, absent rotations, linear displacements along X, Y, Z axes of vehicle coordinates 118 are equivalent to displacements along axes $K_b$, $Y_b$, $Z_b$ of body coordinates 120. Under these circumstances, subscripts "b" can be left off displacements $\Delta x$, $\Delta y$ and $\Delta z$. For reasons of clarity and better reference, body coordinates 120 after undergoing translation are indicated with a prime as translated body coordinates 120'. This is shown only for translation along the X-axis for reasons of clarity.

The three dashed versions of carrier platform 100 shown in FIG. 2A illustrate its vastly exaggerated displacements $\Delta x$, $\Delta y$, $\Delta z$ along positive directions of axes X, Y, Z. In this manner, displacements $\Delta x$, $\Delta y$, $\Delta z$ provide measured values of the correspondent three linear or translational degrees of freedom of carrier platform 100 as parameterized in vehicle coordinates 118. The forward/backward motion is along the X-axis, the right/left or side-to-side motion is along the Y-axis and the up/down motion is along the Z-axis. For positive displacements $\Delta x$, $\Delta y$, $\Delta z$ carrier platform 100 moves to the left, forward and down in the present coordinate convention. These three displacements are shown individually in FIG. 2A. Of course, positive and negative displacements in any combination are possible and may be imparted on carrier platform 100 while vehicle 106 is travelling or is itself impacted by an external force (e.g., due to a collision). One of the important translational degrees of freedom for carrier platform 100 from the point of view of the invention is vertical expressed by $\Delta z$ measured along the Z axis of vehicle coordinates 118.

Figure 2B:
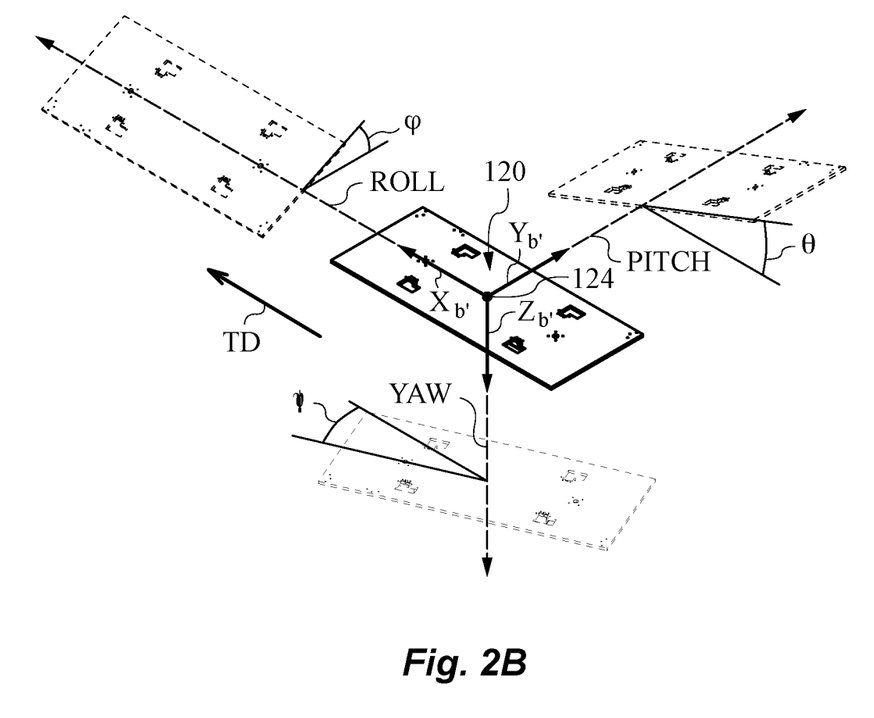

The remaining three degrees of freedom for rigid body motion are rotations. FIG. 2B visualizes these three rotational degrees of freedom available to carrier platform 100. Now, as mentioned above, origin 124 of body coordinates 120 is placed at the center of rotation of carrier platform 100 defined by the mechanical construction of suspension mechanism 102. In this position, origin 124 of body coordinates 120 in equilibrium pose is located directly below a center of mass 130 of carrier platform 100 supporting vibration-sensitive load 104 thereon (see FIG. 1). FIG. 1 shows just center of mass 130 of the combined system including carrier platform 100 and vibration-sensitive load 104.

The three rotational degrees of freedom are represented by roll, pitch and yaw. In FIG. 2B they are visualized individually and independently by corresponding rotation angles $\varphi$, $\theta$ and $\psi$ about the X, Y and Z axes of coordinate system 120, respectively. FIG. 2B shows these three rotations in more detail using a similar visualization convention as employed in FIG. 2A, by artificially offsetting carrier platform 100 after rotation and drawing it in dashed lines.

Rotation by roll angle $\varphi$ occurs around the body axis $K_b$ of body coordinates 120 initially parallel with axis X of vehicle coordinates 118 (see FIG. 1). The default orientation of carrier platform 100 is shown in solid lines. Body axis $K_b$ is extended with a dashed line designated as ROLL, i.e., the rotation axis around which roll angle $\varphi$ is defined.

Rotation by pitch angle $\theta$ occurs about body axis $Y_b$ of body coordinates 120 initially parallel with Y axis of vehicle coordinates 118 (see FIG. 1). Again, the default orientation of carrier platform 100 is shown in solid lines. Body axis $Y_b$ is extended with a dashed line designated as PITCH to stand for the rotation axis around which pitch angle $\theta$ is defined. Rotation by pitch angle $\theta$ keeps body axis $Y_b$ the same under this rotation about rotation axis PITCH.

FIG. 2B further illustrates rotation about body axis $Z_b$ of body coordinates 120 initially parallel with Z axis of vehicle coordinates 118 (see FIG. 1). The default orientation of carrier platform 100 is shown on top in solid lines. Body axis $Z_b$ is extended with dashed line designated as YAW to stand for the rotation axis around which the yaw angle $\psi$ is defined. Yaw angle $\psi$ is the rotation angle between original body axis $K_b$ and rotated axis $X'_b$, as well as between original body axis $Y_b$ and rotated axis $Y'_b$.

Unlike displacements, which are described by vectors or even scalars, the three rotations are described by rotation matrices $R(\varphi)$, $R(\theta)$ and $R(\psi)$. The full rotation matrix R is a composition of rotation matrices $R(\varphi)$, $R(\theta)$, $R(\psi)$ and accounts for all rotational degrees of freedom that a rigid body such as carrier platform 100 described by body coordinates 120 can experience within vehicle coordinate system 118. The full rotation matrix R is obtained by multiplying the individual rotation matrices in a chosen rotation order convention. For the roll, pitch and yaw order the full rotation matrix R is thus: $R=R(\psi) \cdot R(\theta) \cdot R(\varphi)$ (rotation by roll angle $\varphi$ is applied first, and is hence the first matrix in the composition).

Carrier platform 100 can move in any one or more of the six degrees of freedom or DOFs described above in any succession and/or combination. The instantaneous values of the DOFs, i.e., values of the three displacements and three rotation angles, define the position of carrier platform 100 in vehicle coordinates 118. The default or equilibrium positions and orientations, together defining the equilibrium pose, are all taken to be zero, i.e., $\Delta x=0$, $\Delta y=0$, $\Delta z=0$, $\psi=0$, $\theta=0$, $\varphi=0$. The movements of carrier platform 100 are described by time derivatives of the DOFs, here expressed in time derivatives of displacements $\Delta x$, $\Delta y$, $\Delta z$ and time derivatives of rotation angles $\psi$, $\theta$, $\varphi$.

The first order time derivatives, i.e., $dx/dt$, $dy/dt$, $dz/dt$ and $d\psi/dt$, $d\theta/dt$, $d\varphi/dt$ describe the velocities of carrier platform 100 in the corresponding degrees of freedom. These velocities in each of the DOFs are sometimes described with the dot convention as: $\dot{x}$, $\dot{y}$, $\dot{z}$, $\dot{\psi}$, $\dot{\theta}$, $\dot{\varphi}$. Thus, constant linear motion without acceleration in the vertical degree of freedom along the Z axis is the value of $\dot{z}$ and constant rotation about the travel direction TD (see FIG. 1) or about the X axis is the value of $\dot{\varphi}$. Second order time derivatives, i.e., $d^2x/dt^2$, $d^2y/dt^2$, $d^2z/dt^2$ and $d^2\psi/dt^2$, $d^2\theta/dt^2$, $d^2\varphi/dt^2$, or $\ddot{x}$, $\ddot{y}$, $\ddot{z}$, $\ddot{\psi}$, $\ddot{\theta}$, $\ddot{\varphi}$ describe the accelerations of carrier platform 100 in the corresponding degrees of freedom. A constant acceleration in the lateral direction perpendicular to the travel direction TD or along the Y axis is the value of $\ddot{y}$ and a constant angular acceleration about the travel direction TD or about the X axis is the value of $\ddot{\varphi}$.

The often neglected third order time derivatives, i.e., $d^3x/dt^3$, $d^3y/dt^3$, $d^3z/dt^3$ and $d^3\psi/dt^3$, $d^3\theta/dt^3$, $d^3\varphi/dt^3$ or $\dddot{x}$, $\dddot{y}$, $\dddot{z}$, $\dddot{\psi}$, $\dddot{\theta}$, $\dddot{\varphi}$ describe the changes in accelerations of carrier platform 100 in the corresponding degrees of freedom. These are often called "jerks". A jerk in the degree of freedom mapped to the X axis that is coextensive with the direction of travel direction TD is the value of $\dddot{x}$. A jerk in the vertical direction is the value of $\dddot{z}$ and an angular jerk about the vertical axis $\dddot{z}$ is the value of $\dddot{\psi}$. In fact, it is the various and sudden jerks, especially in the linear degrees of freedom of carrier platform 100 that are the most disturbing to vibration-sensitive load 104.

Returning now to FIG. 1, we note that vibration-sensitive load 104 is represented by a person 104A, a cargo in the form of a loose travel bag 104B with delicate items and an accommodation or enclosed resting space 104C. Accommodation 104C may include additional smaller and/or more personalized accommodations for person 104A, here a head rest and support mat. In general, accommodations for the one or more persons that may represent load 104 can include complete sleeping accommodations, living accommodations such as fixtures, furniture, facilities and/or still other accommodations for traveling. When vibration-sensitive load 104 includes cargo 104B or materials to be transported separate accommodations and/or stowage for such cargo can be provided on carrier platform 100 (not shown).

The most problematic motions or vibrations 112 due to vehicle 106 traveling on road 110 are linear displacements along the vertical degree of freedom or Z-axis. These vibrations cause an up and down movement of vibration-sensitive load 104. More precisely, vertical displacement $\Delta z$ and specifically its changes measured by time derivatives along the Z axis, i.e., $\dot{z}$, $\ddot{z}$ and $\dddot{z}$ are the most important to address. The next most problematic motions or vibrations 112 are those corresponding to linear displacements in the horizontal degrees of freedom parameterized by X- and Y-axes.

Figure 3:
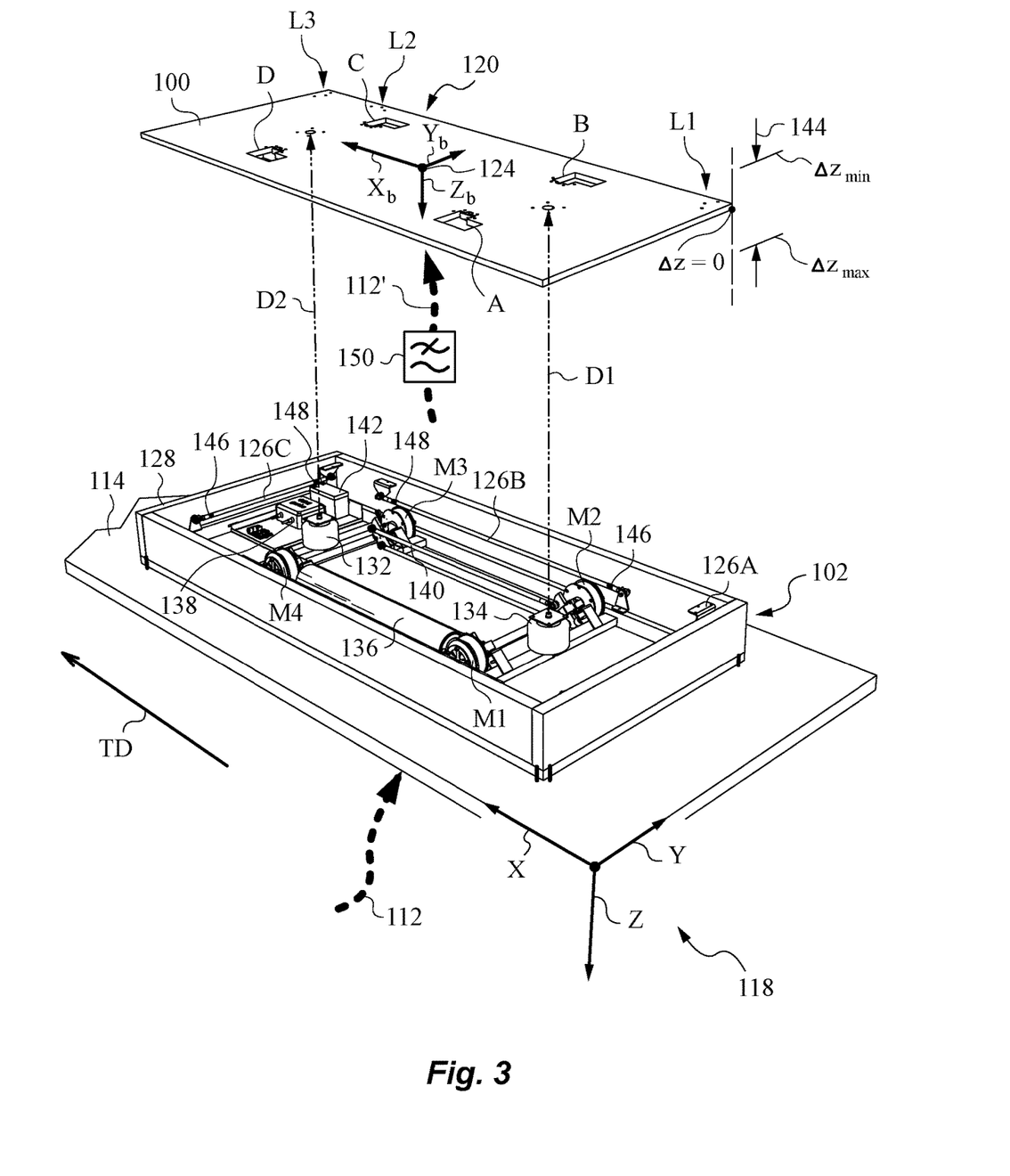
FIG. 3 is an isometric and exploded view of the carrier platform of FIG. 1 and its suspension mechanism to illustrate in more detail its operation

FIG. 3 shows another isometric and exploded view of carrying platform 100 and its suspension mechanism 102 to illustrate how linear displacements in vertical and horizontal degrees of freedom are addressed by the invention. Vibration-sensitive cargo 104 is not shown here. Of vehicle 106 only frame portion 114 to which mounting frame 128 of suspension mechanism 102 is attached is illustrated in FIG. 3 for reasons of clarity.

Suspension mechanism 102 has a set of two springs 132, 134 attached to carrier platform 100 as indicated by dashed and dotted arrows D1, D2. In the present embodiment springs 132, 134 are pneumatic springs. A tank or air reservoir 136 that contains compressed air is connected to pneumatic springs 132, 134 for adjusting the amount of air in them. A corresponding control unit 138 that controls the amount of air in pneumatic springs 132, 134 is provided as part of suspension mechanism 102. The necessary hoses to pass air to and from pneumatic springs 132, 134 are left out in FIG. 3 for reasons of clarity. It is noted that a person skilled in the art is familiar with the operation and control aspects of pneumatic springs 132, 134 supplied from air reservoir 136 under control of unit 138.

Springs 132, 134 are used, among other, for biasing carrier platform 100 along the vertical linear degree of freedom or along the Z-axis. Preferably, the bias is set once carrier platform 100 is already supporting its vibration-sensitive load 104. The bias establishes a position along the Z-axis where the linear displacement $\Delta z$ of carrier platform is zero ($\Delta z=0$). This certain bias position of carrier platform 100 along the Z-axis as set by springs 132, 134 is indicated on the lower right corner of carrier platform 100 along a dashed line parallel and offset from the Z-axis for better visualization.

Suspension mechanism 102 further includes an active damping device 140 with a set of four motors M1, M2, M3 and M4. Active damping device 140 is also attached to carrier platform 100 at mount locations A, B, C and D. The corresponding struts or shafts driven by motors M1, M2, M3, M4 and mounted to mount locations A, B, C, D are visible in FIG. 3 but not expressly labeled for reasons of clarity. A person skilled in the art will be familiar with appropriate mounting of actively driven struts or shafts to a platform such as carrier platform 100.

In the present embodiment the four motors M1, M2, M3 and M4 have a common drive 142 with associated drive shafts (not expressly labelled). In other embodiments, the four motors M1, M2, M3 and M4 can each be provided with an individual drive. For active damping of all degrees of freedom individual drives for motors M1, M2, M3 and M4 are preferred.

The purpose of active damping device 140 is to dampen vibrations experienced by carrier platform 100 in at least one translational degree of freedom. In other words, active damping device 140 dampens vibrations along at least one of the X-, Y- and Z-axes. Specifically, FIG. 3 indicates a range of travel 144 in the vertical degree of freedom along the Z-axis from the bias established at $\Delta z=0$. The upper end of range of travel 144 indicated by a maximum value of displacement along the Z axis is referred to as $\Delta z_{max}$. The lower end of range of travel 144 indicated by a minimum value of displacement along the Z axis is referred to as $\Delta z_{min}$. (Recall that the value of z along the Z axis increases in the down direction and not up; hence the apparent reversal between $\Delta z_{max}$ and $\Delta z_{min}$ as illustrated in FIG. 3).

Although the equilibrium position along the Z axis at $\Delta z=0$ is illustrated half-way between $\Delta z_{max}$ and $\Delta z_{min}$, this is not a requirement. The position bias set by springs 132, 134 along the vertical may place $\Delta z=0$ at different locations within travel range 144. What is preferred, however, is that range of travel 144 be considerably larger than the range within which the bias $\Delta z=0$ can be set. For example, travel range 144 can be 5 cm to 10 cm and even larger. Further, any bias applied to the position of carrier platform 100 along the vertical should not place equilibrium position $\Delta z=0$ closer to either $\Delta z_{max}$ or $\Delta z_{min}$ than the magnitude of the expected vibrations 112 along the vertical.

In accordance with the invention, it is important to incorporate or mount one or more vibration isolators within the set of linkage elements 126A, 126B, 126C that attach carrier platform 100 to mounting frame 128 of suspension mechanism 102. In the present embodiment, linkage elements 126A, 126B, 126C are attached to carrier platform 100 at attachment points L1, L2, and L3 with screws, bolts or other suitable elements. Mounted in this manner, linkage elements 126A, 126B, 126C already accommodate linear motion of carrier platform 100 in a vertical linear degree of freedom along the Z-axis and in two horizontal linear degrees of freedom defined by the X-Y plane.

In the present embodiment, two vibration isolators 146, 148 are incorporated in each linkage element 126A, 126B, 126C, respectively. As seen from attachment points L1, L2, L3, vibration isolators 146 are integrated at a distal end of each linkage element 126A, 126B, 126C. Vibration isolators 148 are incorporated at a proximal end of each linkage element 126A, 126B, 126C as seen from attachment points L1, L2, L3. In the view afforded by FIG. 3 vibration isolators 146, 148 in linkage element 126A are occluded by mounting frame 128.

Vibration isolators 146, 148 used in the present embodiment are both passive isolators. In other words, passive vibration isolators 146, 148 have no active parts or actuators. They are preferably made of a rubber or an elastic. Furthermore, they are mechanically tuned to attenuate vibrations experienced by carrier platform 100 in at least the two horizontal linear degrees of freedom along the X- and Y-axes, or in the X-Y horizontal plane. In a preferred embodiment, passive vibration isolators 146, 148 are made of rubber and they are about 1 to 3 inches long and about 1 inch in diameter. Preferably, such passive vibration isolators 146, 148 offer significant amount of compliance ranging from about plus/minus ⅓ inch for short rubber isolators to about plus/minus 1 inch for long rubber isolators. Furthermore, the tensile properties of passive vibration isolators 146, 148 are tuned through appropriate dimensioning, material selection, as well as tuning for correct torsion and compression properties. Through these choices they are tuned to specifically attenuate vibrations 112 of carrier platform 100 that exhibit high-frequency and small amplitude. Such high-frequency and small amplitude or small excursion vibrations 112 in the X-Y plane are the most serious in affecting vibration-sensitive load 104 after vibrations 112 in the linear vertical degree of freedom along the Z-axis are controlled.

The attenuating action of passive isolators 146, 148 is indicated schematically by a low pass filter 150 acting on vibrations 112 to produce attenuated vibrations 112' transmitted to carrier platform 100. Vibrations 112 contained in a frequency range above about 60 Hz are thus rejected and are absent in attenuated vibrations 112' passed on to carrier platform 100. Partly because of their high frequencies, the attenuated vibrations are small in amplitude or exhibit small linear excursions. For example, during typical road travel high-frequency vibrations 112 rarely produce excursions in the X-Y plane larger than 1-2 inches. It is this characteristic of vibrations 112 frequently encountered during travel in vehicle 106 that renders them suitable for passive isolation practiced by the present invention.

Figure 4:
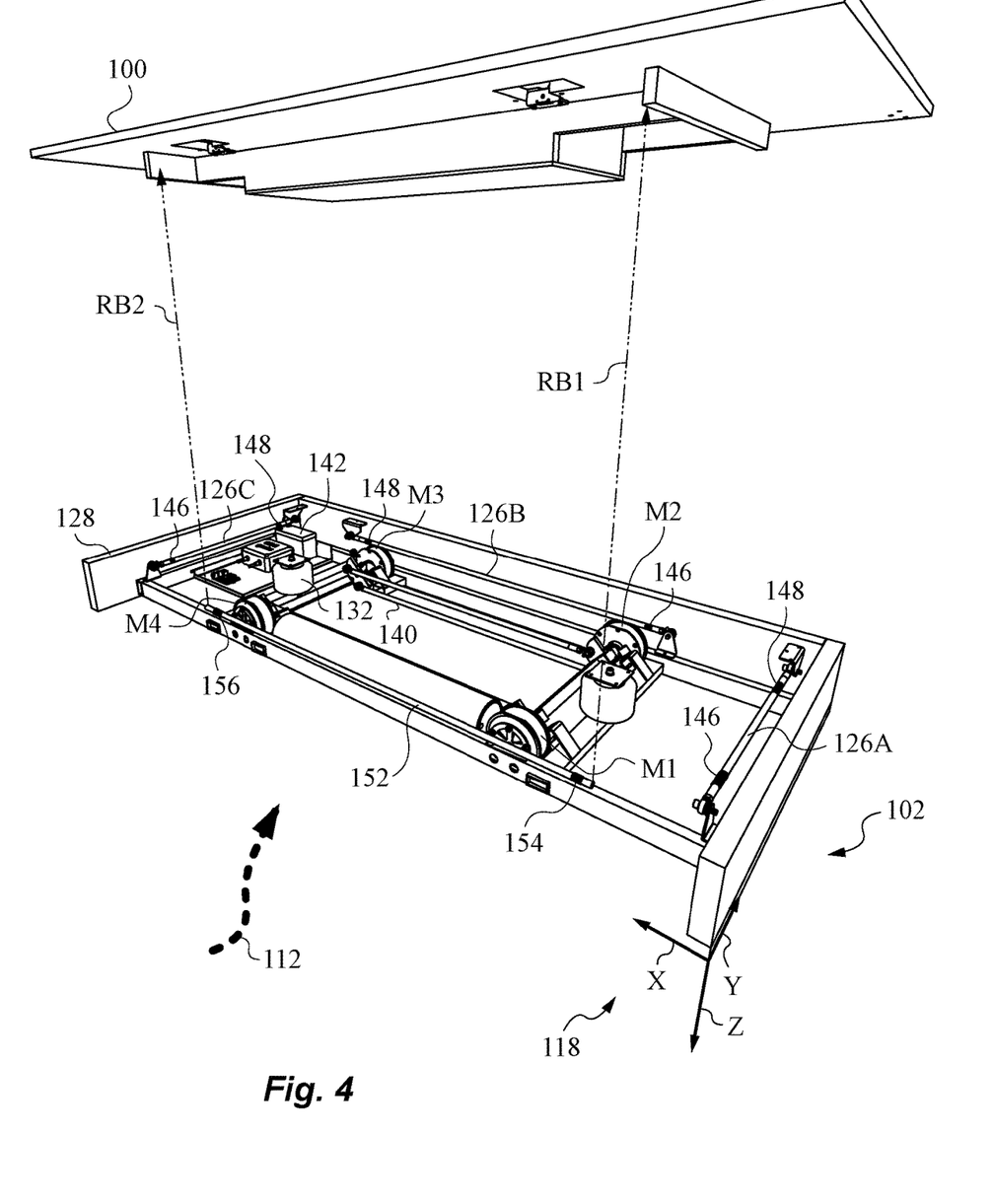
FIG. 4 is an exploded perspective view of the carrier platform of FIG. 1 and its suspension mechanism that shows in more detail the active parts of the suspension mechanism not clearly visible in prior views

FIG. 4 is an exploded perspective and partial view of carrier platform 100 and its suspension mechanism 102. The view afforded by FIG. 4 illustrates in more detail active damping device 140 with its four motors M1, M2, M3, M4 since a side wall and the bottom of mounting frame 128 belonging to suspension mechanism 102 are omitted.

Carrier platform 100 experiences roll, pitch and yaw due to vibrations 112. Although vibrations 112 in these rotational degrees of freedom may not be as severe to vibration-sensitive load 104, they can be highly undesirable and they may be mitigated passively. Thus, in the present embodiment, active damping device 140 is further equipped with a passive vibration isolation bar 152 acting as a roll bar for attenuating vibrations 112 that carrier platform 100 experiences in at least one rotational degree of freedom.

Vibration isolation bar 152 counteracts pitch and roll in particular. Of the three rotational degrees of freedom pitching of carrier platform 100 is the one that tends to be the most disturbing to vibration-sensitive load 104. Pitch is given by rotation angle about rotation axis PITCH (see FIG. 2B) initially collinear with the Y-axis and given by rotation angle $\theta$ and its time derivatives $\dot{\theta}$, $\ddot{\theta}$, and $\dddot{\theta}$. Roll, though not as disturbing, is the rotation about rotation axis ROLL (see FIG. 2B) initially collinear with the X axis and given by rotation angle $\varphi$ and its time derivatives, i.e., $\dot{\varphi}$, $\ddot{\varphi}$ and $\dddot{\varphi}$. The third rotational degree of freedom also shown as rotation by rotation angle $\psi$ about the YAW rotation axis (see FIG. 2C) initially collinear with the Z-axis tends to be less problematic, unless its amplitude is large.

Effectively pitch and roll are attenuated by bar 152 due to its placement in active damping device 140. Specifically, bar 152 fits under carrier platform 100 as indicated by dashed and dotted arrows RB1, RB2 so that it effectively attenuates vibrations in pitch and roll. In addition, bar 152 also limits yaw.

Again, it is the high-frequency and small amplitude or small excursion components of vibrations 112 are most problematic for vibration-sensitive load 104. This is analogous to the situation encountered with linear displacements discussed above. Thus, it is advantageous to incorporate passive vibration isolators 154, 156. This is done in a manner similar to incorporating passive vibration isolators 146, 148 into linkage elements 126A, 126B, 126C. The tensile properties of passive vibration isolators 154, 156 are again tuned through appropriate dimensioning, material selection, as well as tuning for correct torsion and compression properties. Through these choices they are tuned to specifically attenuate vibrations 112 of carrier platform 100 in at least one of the rotational degrees of freedom that exhibit high-frequency and small amplitude.

Figure 5A:
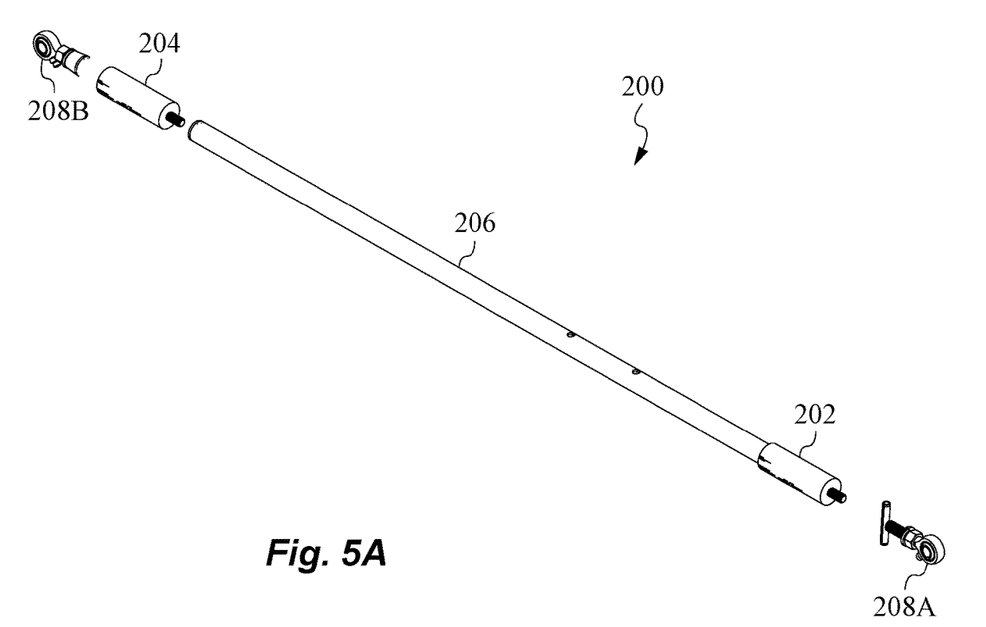
FIG. 5A is an isometric view of a linkage equipped with two passive vibration isolators according to the invention

FIG. 5A is an isometric view of a linkage element 200 equipped with two passive vibration isolators 202, 204 at its proximal and distal ends, respectively. The linkage element is exploded along its longitudinal axis for clarity. Isolators 202, 204 are made of rubber and are provided with screws for mounting them in linkage 200. Linkage element 200 has a stiff rod or shaft 206 with provisions to mount isolators 202, 204 along the longitudinal axis in shaft 206. In the present embodiment the mounting provisions of shaft 206 are threaded bore holes that accommodate corresponding screws protruding from both ends of isolators 202, 204. Of course, other mechanically robust options can be used for mounting or integrating isolators 202, 204 in shaft 206 in an axially secure and stable way that prevents torsion or bending.

The proximal and distal ends of linkage element 200 are equipped with mounting fixtures 208A, 208B. Mounting fixtures 208A, 208B are attached to a carrier platform and to a secondary suspension in accordance with the invention. For example, linkage 200 can be used in the previously described embodiment as any one and up to all linkage elements 126A, 126B, 126C. Furthermore, isolators 202, 204 can be mounted at different locations along the length of linkage element 200, for example spaced further from mounting fixtures 208A, 208B as long as torsion and bending are properly counteracted.

Figure 5B:
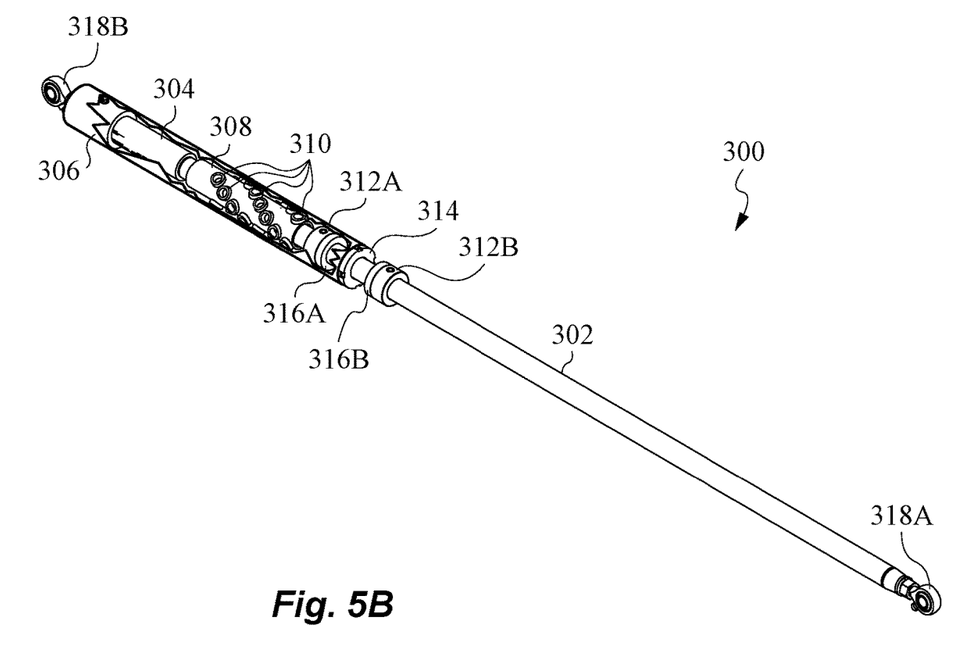
FIG. 5B is an isometric view of a linkage equipped with a passive vibration isolator and a guidance mechanism therefor

In fact, FIG. 5B shows an isometric view of another linkage element 300 with provisions for preventing bending. In this embodiment linkage element 300 has a shaft 302 and just one passive vibration isolator 304 made of rubber mounted at a distal end of shaft 302. Vibration isolator 304 is located within a tube 306 which is shown with a partial cut-away to illustrate isolator 304 and other parts contained inside tube 306. Specifically, tube 306 is maintained coaxial with shaft 302 of linkage element 300 by a sleeve 308 with bearing elements (not shown) lodged in a plurality of cutouts 310. Thus, as isolator 304 extends and compresses due to vibrations any torsion that it may experience does not cause linkage element 300 to bend.

Further, shaft 302 has two hard stops 312A, 312B that limit the amount of extension and compression of isolator 304. Under extension hard stop 312A runs into and is stopped by a tube wall 314. Under compression hard stop 312B runs into and is likewise stopped by tube wall 314. In order to prevent jarring crashes against tube wall 314 hard stops 312A, 312B are provided with felt washers 316A, 316B.

The proximal and distal ends of linkage element 300 are equipped with mounting fixtures 318A, 318B. Mounting fixtures 318A, 318B are attached to a carrier platform and to a secondary suspension in accordance with the invention. For example, linkage 300 can be used in the previously described embodiment as any one and up to all linkage elements 126A, 126B, 126C.

Figure 6A:
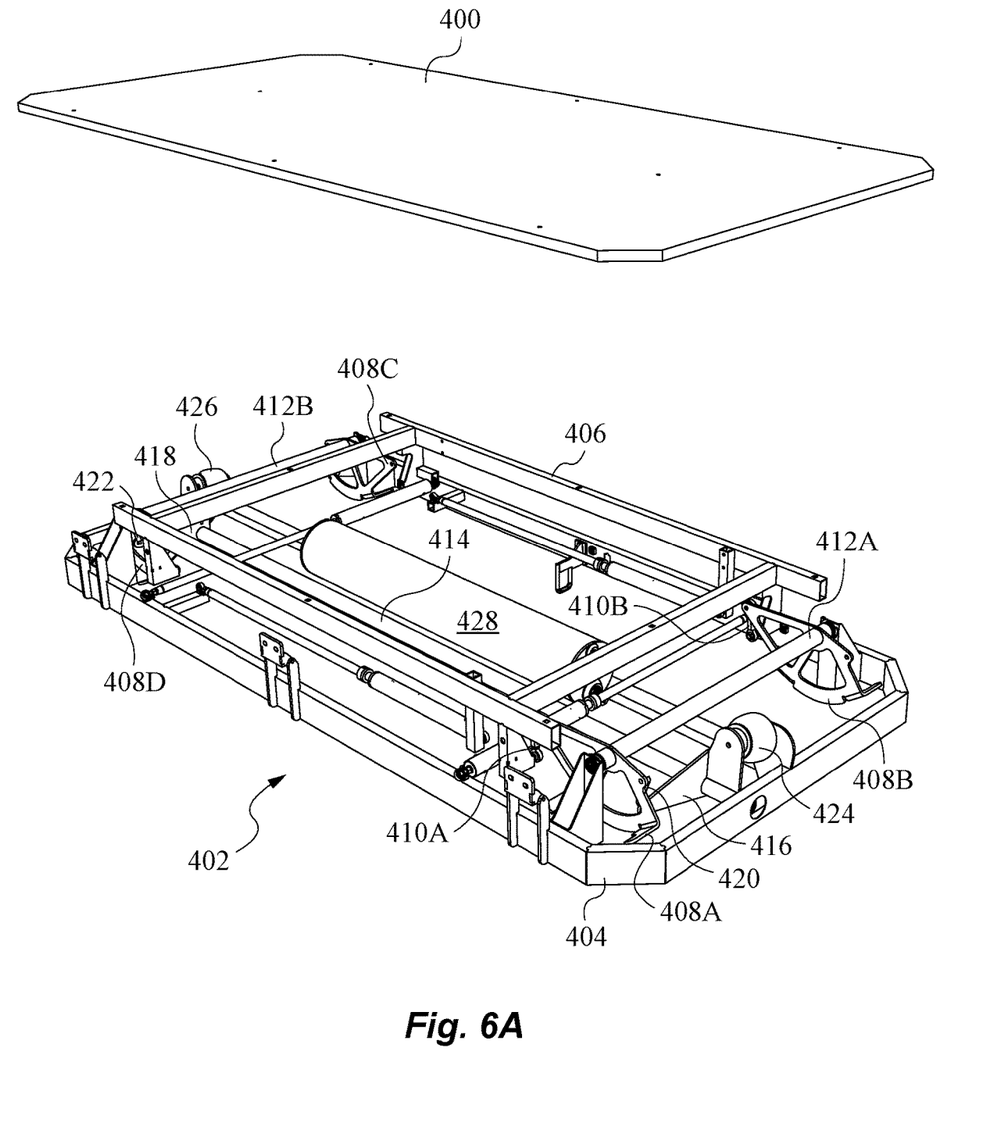
FIG. 6A-B are two perspective views another carrier platform according to the invention

FIG. 6A is a perspective view of another embodiment of a carrier platform 400 with a suspension mechanism 402. Platform 400 is shown detached and above suspension mechanism 402 to expose its parts. Vibration-sensitive load and the vehicle on which platform 400 is mounted are not shown for reasons of clarity.

Suspension mechanism 402 has a lower frame assembly 404 that carries an upper frame assembly 406 on which platform 400 is mounted. Upper frame assembly 406 is mounted in a synchronized manner using four cranks 408A-D installed at the four corners of lower frame assembly 404. The mechanical connection between cranks 408A-D and upper frame assembly 406 is afforded by links 410A-D, respectively (only links 410A-B shown in FIG. 6A).

Fore cranks 408A-B are synchronized by an anti-roll bar 412A that connects them. Meanwhile, aft cranks 408C-D are synchronized by being connected with an anti-roll bar 412B. The fore-aft connection between fore cranks 408A-B and aft cranks 408C-D is established by an anti-pitch tube or bar 414. Anti-pitch tube 414 is connected to fore cranks 408A-B and to aft cranks 408C-D by cranks 416, 418 and linkages 420, 422, respectively. Thus, mechanical synchronization is achieved in the movement of upper frame assembly 406 from side-to-side and front-to-back.

Active damping of the vertical degree of freedom is again achieved pneumatically with air bags 424, 426 mounted to frame 404 and to cranks 416, 418, respectively. In this embodiment air bags 424, 426 are mounted sideways and provide the normal force for movement up and down by acting on cranks 416 and 418. This arrangement leverages a relatively large amount of vertical travel to a relatively small amount of expansion and contraction of air bags 424, 426. In fact, a 4-1 ratio is easily accommodated with such design. For example, the present embodiment supports about plus 4 inches to minus 4 inches of vertical travel while air bags 424, 426 inflate and deflate to yield just 2 inches of displacement. It is noted that air bags 424, 426 do bend slightly as they inflate and deflate.

The pressurized air to operate air bags 424, 426 is supplied from an air reservoir or tank 428. The hoses connecting air tank 428 to air bags 424, 426 are not shown. Since air bags 424, 426 move only k as much as upper frame assembly 406, the air pressure supplied by air tank 428 has to be four times greater than in the previous embodiment. Conveniently, compressed air can be provided to air tank 428 from the vehicle's own pneumatic system, as already exists in most trucks. This obviates the need for additional electronics and controls. For example, air can be provided from the vehicle's pneumatic system until upper frame assembly 406 reaches a desired height or bias and is then stopped. In this mode passive attenuation in the vertical degree of freedom is accomplished without any dedicated electronics or controls.

Figure 6B:
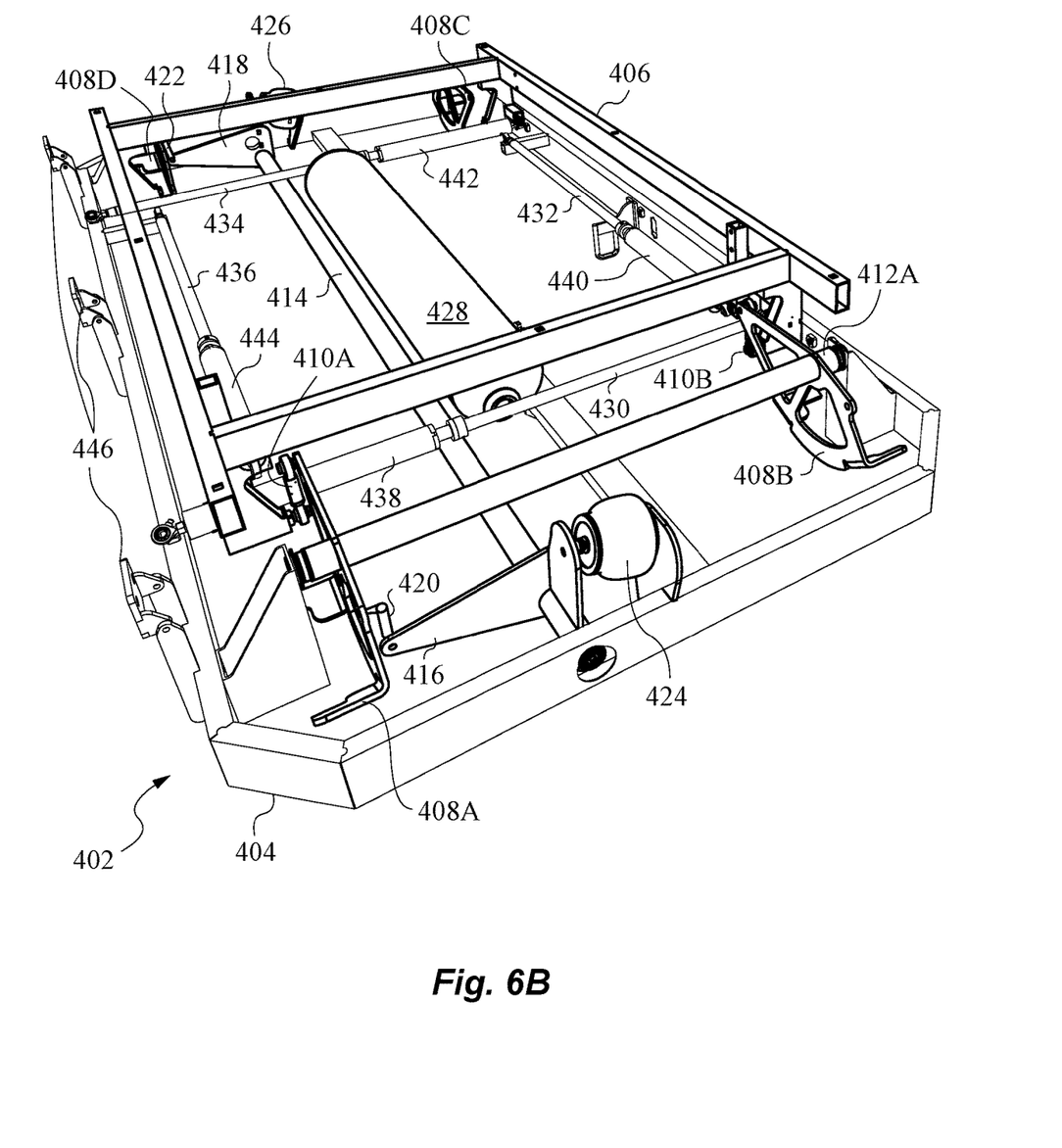

FIG. 6B shows another perspective view of the same embodiment but without platform 400 and from a point of view that better shows the details of support mechanism 402 that provide for passive damping or attenuation in the horizontal degrees of freedom (X- and Y-axes).

Specifically, mechanism 402 has four linkage elements 430, 432, 434, 436 that provide for attenuation of horizontal vibrations without bending. Linkage elements 430, 432, 434, 436 are analogous in construction to linkage element 300 shown in FIG. 5B. Thus, the rubber vibration isolators are within respective tubes 438, 440, 442, 444 and not visible here.

Because of the relatively large lengths of linkage elements 430, 432, 434, 436 the cosine error experienced when upper frame assembly 406 moves up and down is very small. This limits to an insignificant amount the extension or compression experienced by the rubber vibration isolators.

In the present embodiment the vibration isolators in linkage elements 430, 432, 434, 436 achieve passive attenuation of the two horizontal degrees of freedom. Air bags 424, 426 provide for passive attenuation of the vertical degree of freedom (Z-axis). The addition of active damping in the vertical degree of freedom can be accomplished by adding active control to the pneumatic system and more specifically actively controlling the air pressure in air tank 428 that is connected to air bags 424, 426. Furthermore, up to three rotational degrees of freedom of carrier platform 400 can be attenuated by allowing some torsional compliance in linkage elements 430, 432, 434, 436 and/or by separately controlling cranks 408A-D. The rotational degrees of freedom, namely roll, pitch and yaw are thus attenuated passively within a certain range. In other words, all six degrees of freedom are addressed by active damping and passive attenuation in the present embodiment with adjustments. Alternatively, roll, pitch and yaw can be actively dampened.

Although air bags have been used as springs in the above embodiments, any springs that can act to bias and also to passively attenuate linear motion along Z can be used. These can be used in addition to active damping or they can be adjusted to implement active damping and remove the need for additional devices.

Depending on the intended use of the carrier platform, an attachment mechanism can be provided for mounting the carrier platform in the vehicle. The attachment mechanism may be of particular importance when the vibration-sensitive load includes one or more persons.

Returning to FIG. 6B, we note a preferred embodiment in which an attachment mechanism 446 includes three swivels for accommodating carrier platform 400 in a deployed configuration, i.e., unfolded as shown, and in a stowed configuration where it is folded upward. The deployed configuration can be designed to permit a person or a passenger to sit or lie down, while the stowed configuration can be designed to create maximum space for the person or persons to move about in the vehicle.

Figure 7:
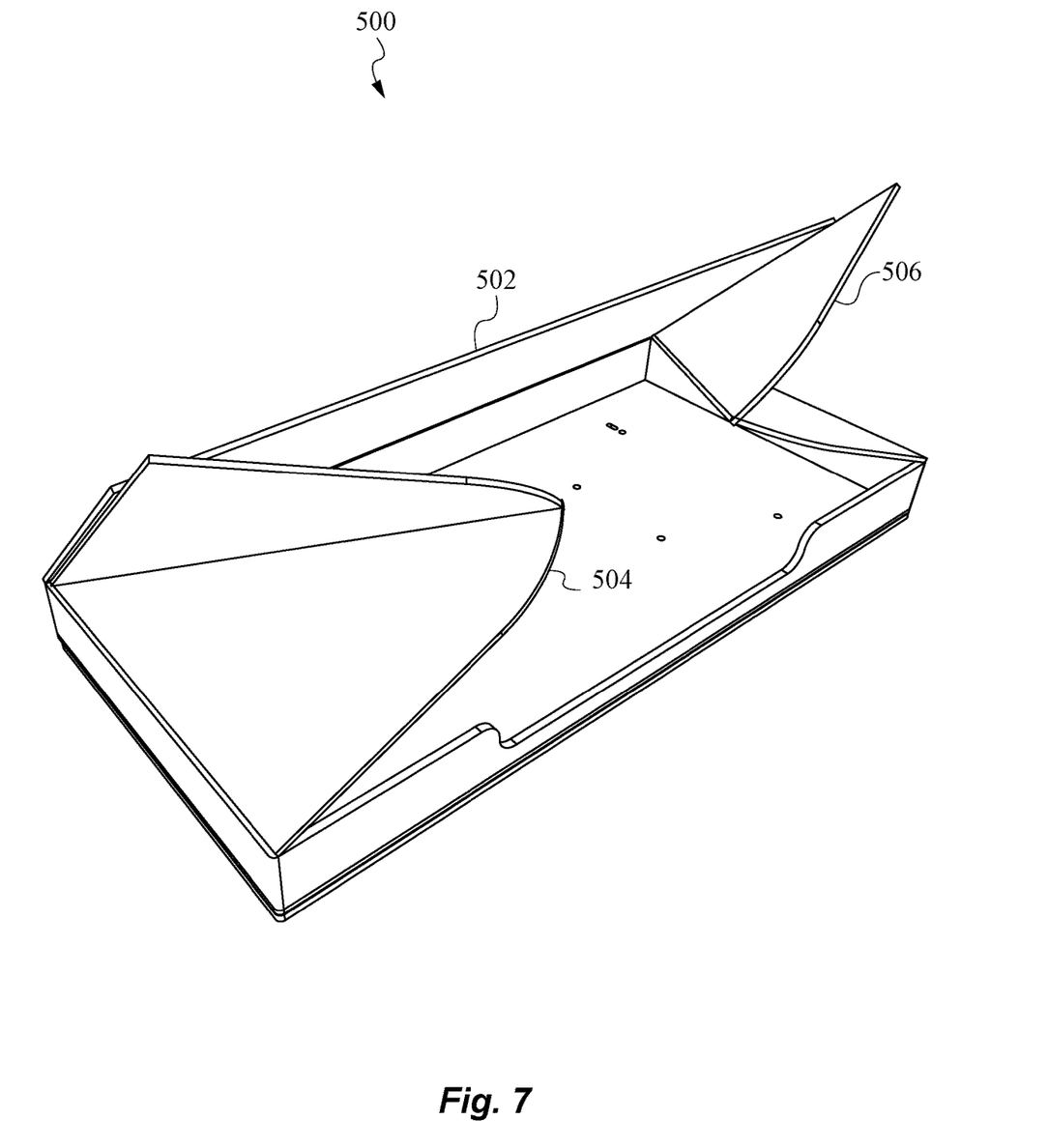
FIG. 7 is a perspective view of a foldable berth that can be mounted a carrier platform according to the invention

FIG. 7 is a perspective view of a foldable berth 500 that can be mounted on any of the above carrier platforms that support folding. For example, berth 500 can be mounted on top of carrier platform 400 such that a back side 502 is on the side of attachment mechanism 446. Foldable berth 500 has two foldable side panels 504, 506 that permit berth 500 to be put into a collapsed configuration and folded in an upright position, e.g., against a side wall of the vehicle. Such stowage configuration is very convenient when maximizing usable space within the vehicle while berth 500 is not being used.

It should be noted, that carrier platforms according to the invention can be adapted for installation in vehicles that do not travel on wheels. For example, carrier platforms described above or alternative versions of these embodiment can be installed in a marine vehicle, an aircraft or still other transport or conveyance means.

From the above description it should be clear that many alternative embodiments are possible. The carrier platform and its suspension mechanism may be implemented in different configuration(s) depending on type of vehicle and space constraints. For example, when vertical clearance is not an issue, the range of travel as well as the low amplitude in of admissible motion can be increased. For example, the low amplitude may range beyond 40 mm up to about 100 mm when headroom is available for any vibration-sensitive load carried on the platform.

It will be evident to a person skilled in the art that the present invention admits of various other embodiments. Therefore, its scope should be judged by the claims and their legal equivalents.

The invention claimed is:

1. A carrier platform having a suspension mechanism for supporting a vibration-sensitive carrier load on a vehicle, said suspension mechanism comprising:
   a) a set of linkage elements attached to said carrier platform for accommodating linear motion of said carrier platform in a vertical linear degree of freedom and in two horizontal linear degrees of freedom;
   b) a set of springs attached to said carrier platform for biasing said carrier platform along said vertical linear degree of freedom;
   c) an active damping device having a set of motors, said active damping device being attached to said carrier platform for damping vibrations experienced by said carrier platform in at least one translational degree of freedom; and
   d) vibration isolators mounted within said set of linkage elements, said vibration isolators being mechanically tuned to attenuate vibrations of said carrier platform in at least said two horizontal linear degrees of freedom.

2. The carrier platform of claim 1, wherein said vibration isolators comprise at least one passive isolator tuned to attenuate vibrations of said carrier platform exhibiting high-frequency and small amplitude.

3. The carrier platform of claim 1, wherein said active damping device further comprises a passive vibration isolation bar for attenuating vibrations of said carrier platform in a rotational degree of freedom.

4. The carrier platform of claim 3, wherein said rotational degree of freedom is selected from among roll and pitch and said passive vibration isolation bar comprises at least one passive isolator.

5. The carrier platform of claim 1, wherein said vibration isolators and said active damping device are configured to actively dampen and passively attenuate said vertical degree of freedom, said two horizontal degrees of freedom and up to three rotational degrees of freedom of said carrier platform.

6. The carrier platform of claim 5, wherein said up to three rotational degrees of freedom of said carrier platform include roll, pitch and yaw.

7. The carrier platform of claim 6, wherein said roll, pitch and yaw are passively attenuated.

8. The carrier platform of claim 6, wherein said roll, pitch and yaw are actively dampened.

9. The carrier platform of claim 1, wherein said set of motors of said active damping device comprises four motors having a common control drive.

10. The carrier platform of claim 1, wherein said set of motors of said active damping device comprises four motors each having an individual control drive.

11. The carrier platform of claim 1, further comprising an attachment mechanism for mounting said carrier platform in said vehicle.

12. The carrier platform of claim 11, wherein said attachment mechanism comprises a swivel for accommodating said carrier platform in a deployed configuration and in a stowed configuration.

13. The carrier platform of claim 11, wherein said vibration-sensitive load comprises at least one person and said carrier platform comprises an accommodation for said at least one person.

14. The carrier platform of claim 11, wherein said vibration-sensitive load comprises a cargo and said carrier platform comprises an accommodation for said cargo.

15. A method for suspending a carrier platform for supporting a vibration-sensitive carrier load on a vehicle, said method comprising:
   a) attaching a set of linkage elements to said carrier platform for accommodating linear motion of said carrier platform in a vertical linear degree of freedom and in two horizontal linear degrees of freedom;
   b) attaching a set of springs to said carrier platform for biasing said carrier platform along said vertical linear degree of freedom;
   c) attaching an active damping device having a set of motors to said carrier platform for damping vibrations experienced by said carrier platform in at least one translational degree of freedom; and
   d) mounting vibration isolators within said set of linkage elements, said vibration isolators being mechanically tuned to attenuate vibrations of said carrier platform in at least said two horizontal linear degrees of freedom.

16. The method of claim 15, further comprising mounting at least one passive isolator among said vibration isolators and tuning said passive isolator to attenuate vibrations of said carrier platform exhibiting high-frequency and small amplitude.

17. The method of claim 15, further comprising attenuating vibrations of said carrier platform in at least one rotational degree of freedom selected from among roll, pitch and yaw by providing said active damping device with a passive vibration isolation bar.

18. The method of claim 15, further comprising configuring said vibration isolators and said active damping device to actively dampen and passively attenuate said vertical degree of freedom, said two horizontal degrees of freedom and up to three rotational degrees of freedom of said carrier platform.

19. The method of claim 18, wherein said up to three rotational degrees of freedom of said carrier platform include roll, pitch and yaw.

20. The method of claim 19, wherein said roll, pitch and yaw are passively attenuated.

21. The method of claim 19, wherein said roll, pitch and yaw are actively dampened.

* * * * *